(12) United States Patent
Hallifax et al.

(10) Patent No.: US 7,645,538 B1
(45) Date of Patent: Jan. 12, 2010

(54) FILL PLUG FOR ELECTROCHEMICAL CELL

(75) Inventors: Paul T. Hallifax, Gasport, NY (US); David Warchocki, North Tonawanda, NY (US); James Ditzel, Sanborn, NY (US); Gary Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 874 days.

(21) Appl. No.: 11/209,150

(22) Filed: Aug. 22, 2005

(51) Int. Cl.
*H01M 2/36* (2006.01)
*H01M 2/38* (2006.01)
(52) U.S. Cl. .......................... 429/80; 429/72
(58) Field of Classification Search ............ 429/72, 429/80
See application file for complete search history.

(56) References Cited

U.S. PATENT DOCUMENTS 4,833,047 A * 5/1989 Isoi et al. ............. 429/72
5,356,734 A 10/1994 Oureshi
6,001,504 A 12/1999 Batson et al.
6,610,443 B2 8/2003 Paulot et al.

FOREIGN PATENT DOCUMENTS

JP 2003-249422 A 9/2003

\* cited by examiner

*Primary Examiner*—Patrick Ryan
*Assistant Examiner*—Julian Mercado
(74) *Attorney, Agent, or Firm*—Michael F. Scalise

(57) ABSTRACT

The present invention is directed to any electrochemical cell casing design having an electrolyte fill aperture. The electrolyte fill aperture receives and directs the electrolyte into the casing. A fill plug has at least two components—an insert section detachably connected to a placement unit. The placement unit allows a user to properly position the insert section into the electrolyte fill aperture. Once this is done, the placement unit is detached from the insert section. The insert section in then hermetically sealed to the casing. If desired, the fill plug can be used for filling the electrolyte in the casing.

20 Claims, 10 Drawing Sheets

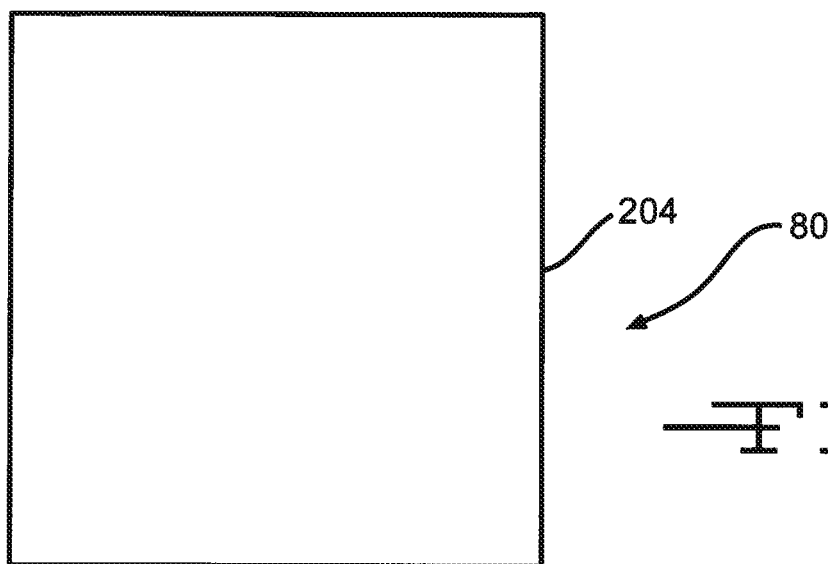
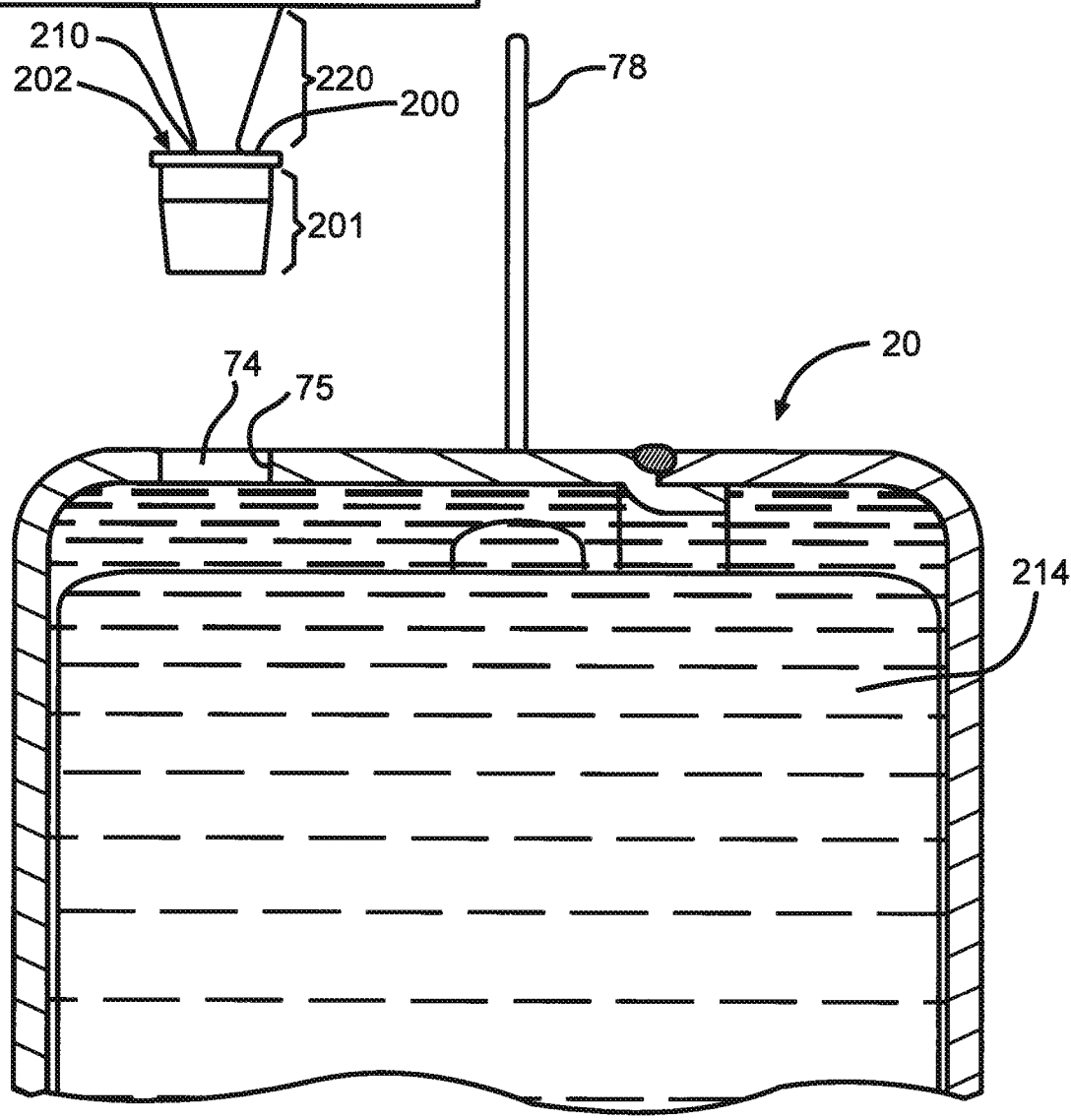
FIG. 11

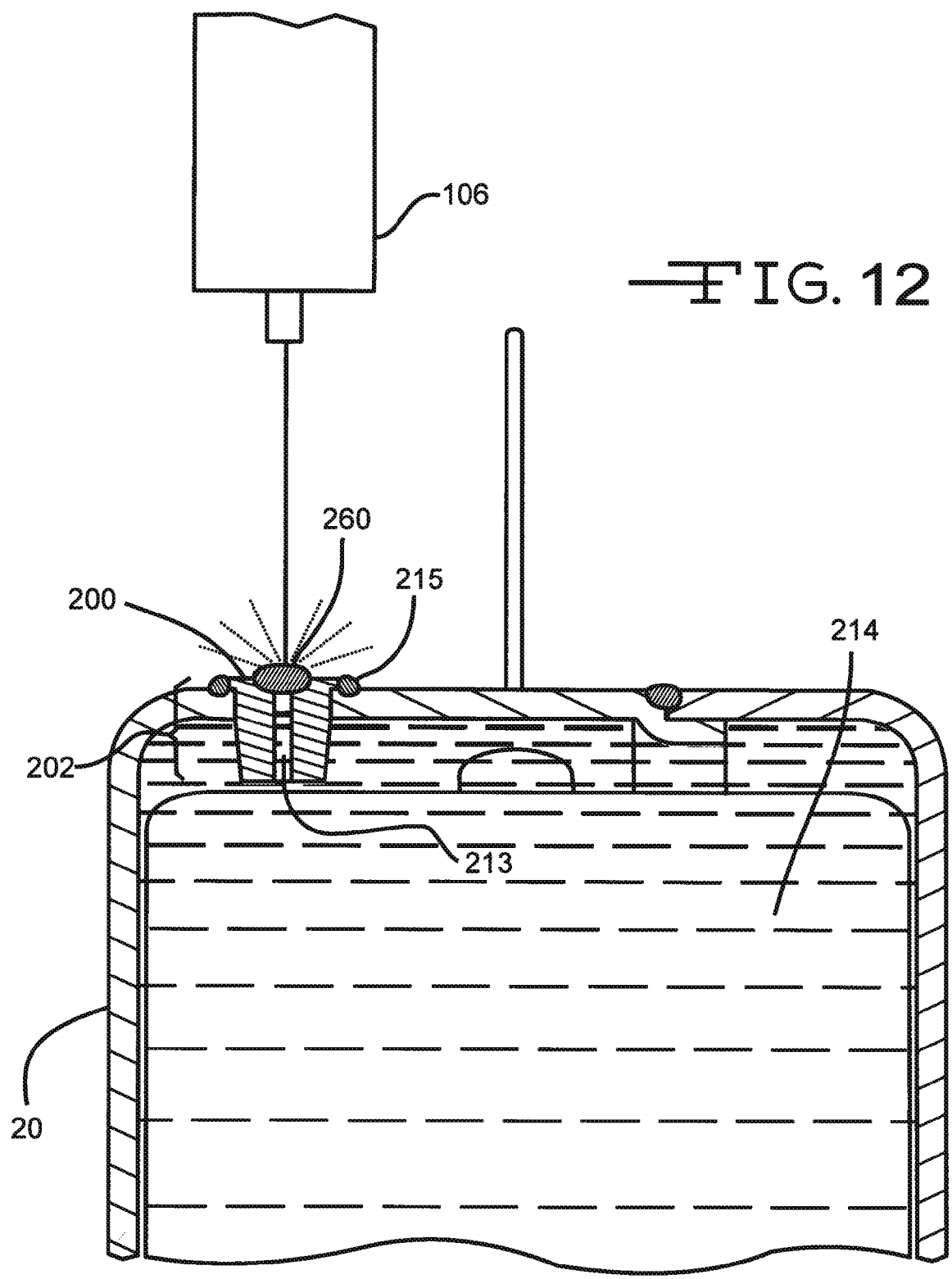

FILL PLUG FOR ELECTROCHEMICAL CELL

BACKGROUND OF THE INVENTION

1. Field of the Invention

The present invention is suitable for any type of casing for an electrolytic cell wherein the casing has an electrolyte-filling aperture. In particular, the casing can be any design including, and not limited to, a clamshell and/or a prismatic casing design. The invention is directed to an apparatus and method to seal the electrolyte-filling aperture with a fill plug.

2. Prior Art

Electrochemical cells are housed inside casings having an electrolyte fill aperture and a closure mechanism for the fill aperture. To activate the cell, an electrolyte is poured into the casing through the electrolyte fill aperture. Once this is done, the closure mechanism is inserted into the fill aperture and welded (or brazed) to the casing to ensure the electrolyte does not leak from the casing.

One problem is that the closure mechanism is often difficult to position into the electrolyte fill aperture. This is the result of the closure mechanism and the electrolyte fill aperture both being extremely small, which makes it difficult to properly position, and also secure, the closure mechanism into the electrolyte fill aperture. The present invention solves this problem.

SUMMARY OF THE INVENTION

The present invention is directed to any electrochemical cell casing design having an electrolyte fill aperture. The electrolyte fill aperture receives and directs the electrolyte into the casing. The fill plug has at least two components—an insert section detachably secured to a placement unit. At least a portion of the insert section is inserted into the electrolyte fill aperture. The placement unit is large enough to allow a user to properly position the insert section into the electrolyte fill aperture and then secure it to the casing. Once the insert section is at least initially secured to the casing and the casing contains a sufficient quantity of electrolyte, the placement unit is detached from the insert section.

The foregoing and additional advantages and characterizing features of the present invention will become clearly apparent upon reading the ensuing description together with the included drawings wherein:

BRIEF DESCRIPTION OF THE DRAWINGS

FIG. 11 illustrates an embodiment showing electrolyte 214 having been filled into the casing through an electrolyte fill aperture 74 prior to insertion of the plug 80 into the aperture.

FIG. 12 illustrates FIG. 11 without a placement unit of the fill plug and the hollowed out section of an insert section of the fill plug being welded closed.

BEST MODES FOR CARRYING OUT THE INVENTION

Figure 1:
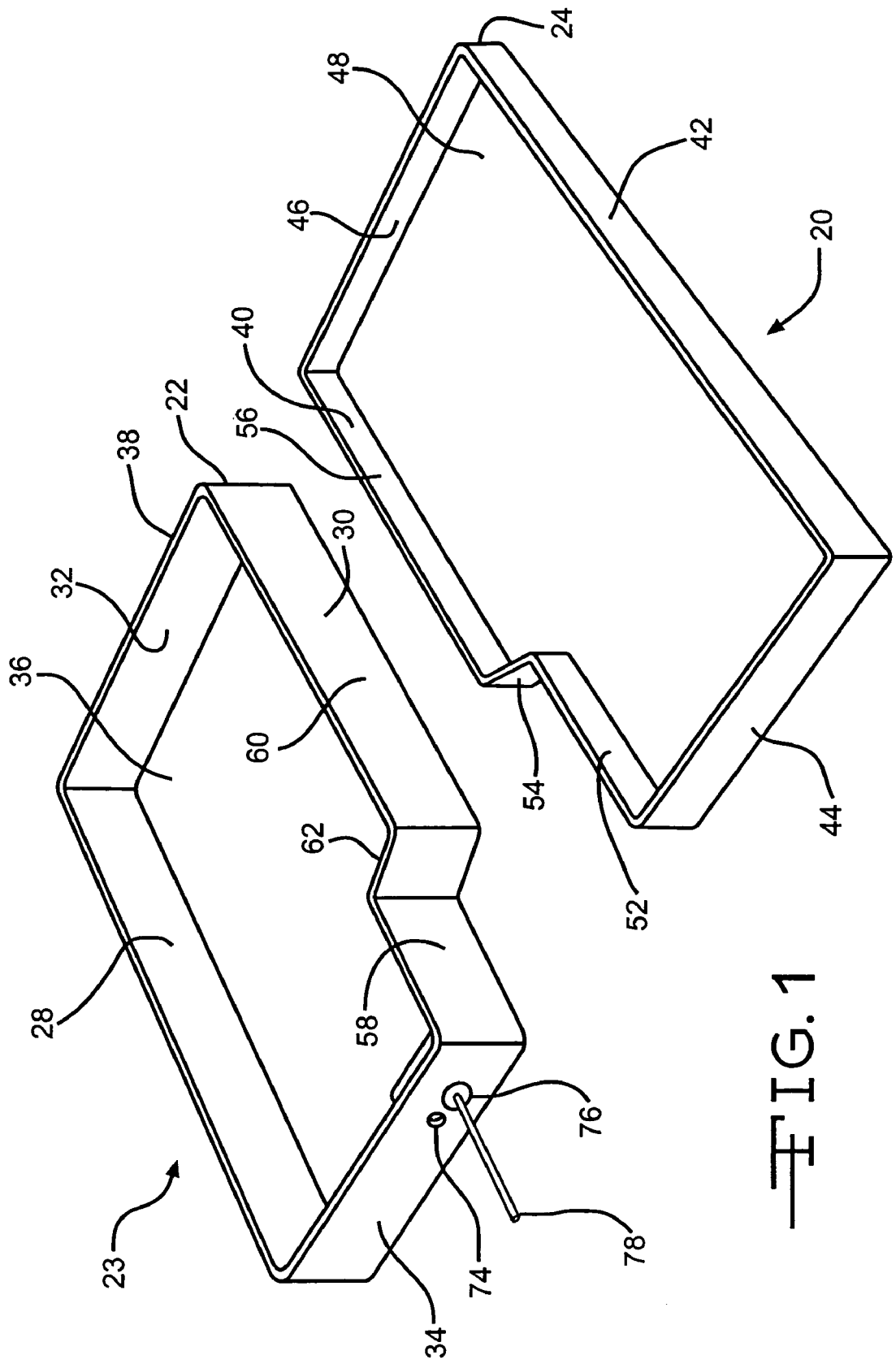
FIG. 1 shows a casing design embodiment having first and second clam shell portions laid open with one of the clam shell portions having an electrolyte fill aperture.

The present invention is directed to an apparatus and a method to plug an electrolyte fill aperture 74 on an electrochemical cell casing 20, as illustrated in FIG. 1. The electrolyte fill aperture receives and directs an electrolyte into an electrochemical cell's casing 20. Within the casing 20 is an electrochemical system that comprises at least an anode, a cathode, a separator, and an electrolyte, which will be described in greater detail below.

The electrochemical casing 20 can be any conventional assembly that can contain an electrochemical system and has an electrolyte fill aperture. As shown in FIGS. 1 to 4, the casing 20 has first and second clam shell portions 22 and 24 that are mated together and sealed about their periphery to provide a hermetic enclosure for an electrode assembly 26. The mating clamshells 24 and 22 are stamped or otherwise formed from sheet metal to a shape desired for a particular application.

The first clamshell 22 comprises spaced apart sidewalls 28 and 30 extending to and meeting with spaced apart end walls 32 and 34. The sidewalls 28, 30 and the end walls 32, 34 meet each other at rounded corners and extend to a front wall 36. Opposite the front wall 36 is a continuous edge 38 of sidewalls 28, 30 and end walls 32, 34.

The second clamshell 24 comprises spaced apart sidewalls 40 and 42 extending to and connecting with spaced apart end walls 44 and 46. The sidewalls 40 and 42 and end walls 44 and 46 meet at rounded corners and extend to front wall 48. Opposite the front wall is a continuous edge 50 of the sidewalls 40 and 42 and end walls 44 and 46. End wall 46 has a greater length than end wall 44. In this manner, side wall 40 includes a first portion 52 extending from end wall 44 and forming into an angled side wall portion 54 which meets a second portion 56 of side wall 40 extending to the end wall 46.

The second clamshell 24 is sized to fit inside the periphery of the first clamshell 26 in a closely spaced relationship. This means that side wall 42 is somewhat shorter than side wall 28; end wall 46 is somewhat shorter than end wall 32, side wall 40 is somewhat shorter than side wall 30 and end wall 44 is somewhat shorter than end wall 34. Also, the first and second portions 52 and 56 of side wall 40 are sized to be received inside the first and second portions 58 and 60 of side wall 30 with the intermediate angled side wall portion 54 of side wall 40 aligned with and received inside of the intermediate angled side wall portion 62 of side wall 30. Preferred sealing methods include welding and brazing.

Figure 13:
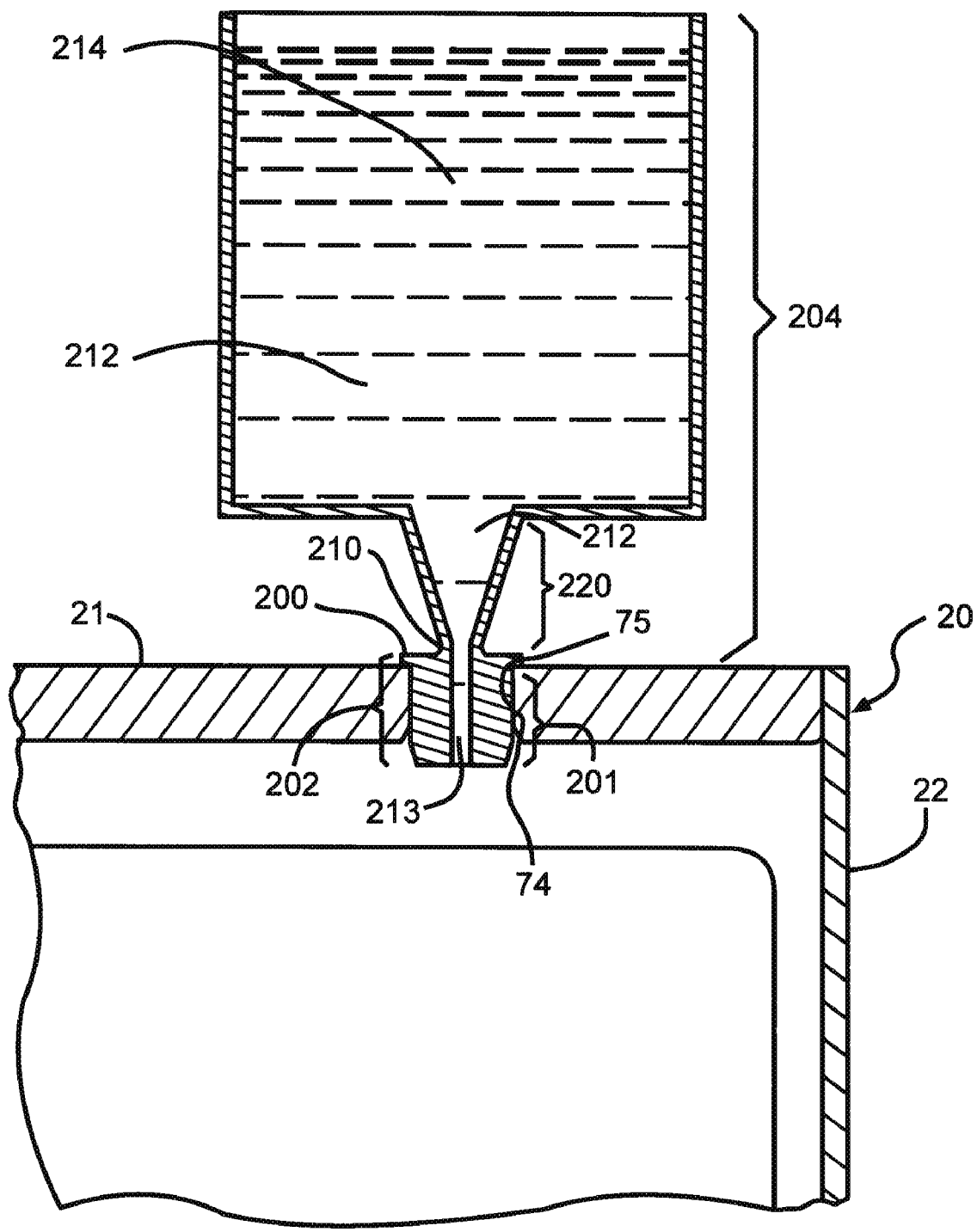
FIG. 13 illustrates an alternate embodiment of a portion of a conventional casing and lid configuration with a fill plug in an electrolyte fill aperture.

Other electrolytic casing designs can be used in the present invention. For example, the casing can have a prismatic design, or a conventional case 22/lid 21 configuration (FIG. 13). The above-description of the casing (which includes the lid for conventional casing designs) is merely to identify the generic characteristics of a casing that can be used with the present invention—a casing that can contain an electrochemical system and has an electrolyte fill aperture 74.

Figure 2:
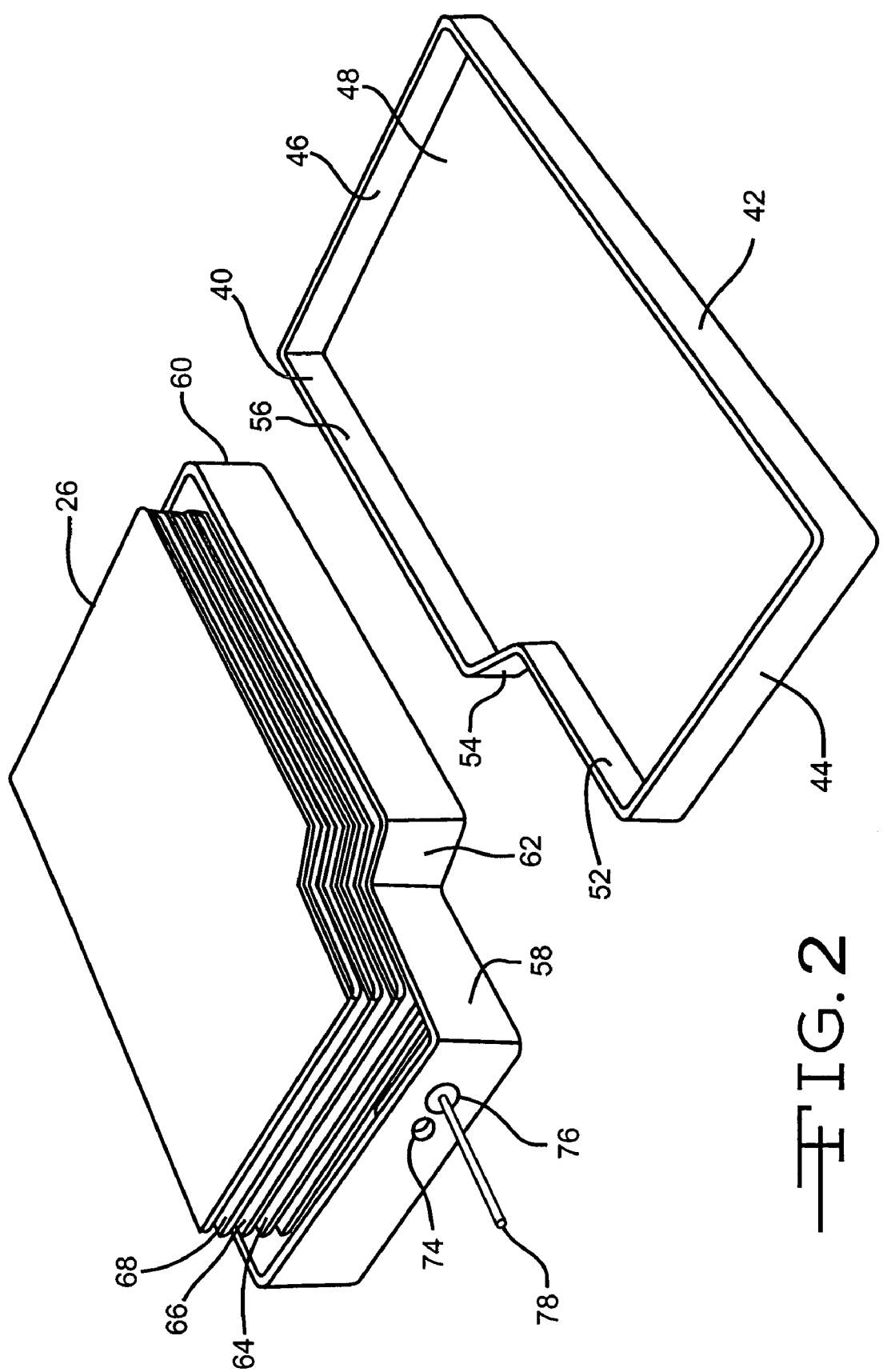
FIG. 2 illustrates the casing design of FIG. 1 with an electrode assembly in the clamshell portion having the electrolyte fill aperture.
Figure 3:
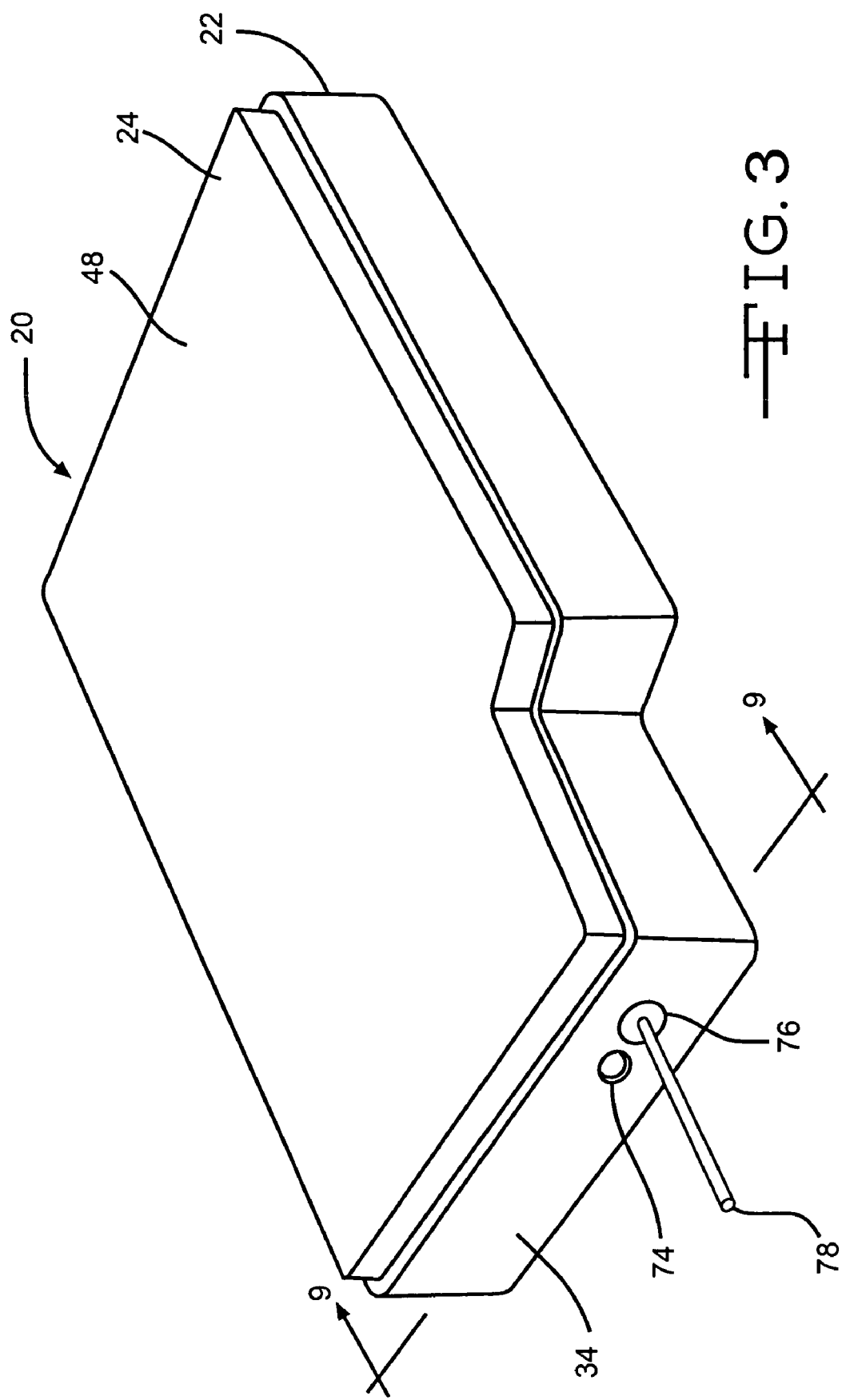
FIG. 3 illustrates the casing design of FIG. 2 in a closed embodiment.
Figure 4:
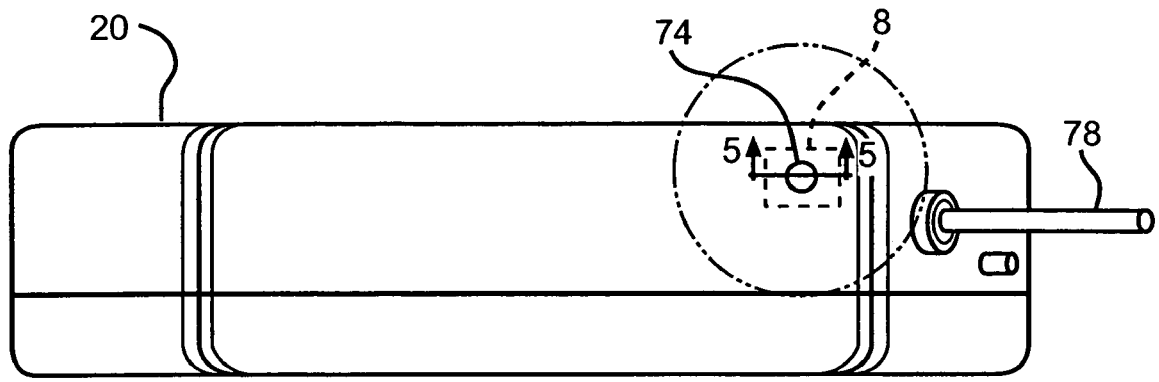
FIG. 4 illustrates a top view of an alternate casing embodiment of FIG. 1 showing a cylindrical electrolyte fill aperture.

As shown in FIG. 2, casing 20 contains an electrode assembly 26 having an anode 64 selected from Group IA of the Periodic Table of Elements, including lithium, sodium, potassium, etc., and their alloys and intermetallic compounds including, for example Li—Si, Li—B and Li—Si—B alloys and intermetallic compounds. The preferred anode comprises lithium, and the more preferred anode comprises a lithium alloy, the preferred lithium alloy being lithium-aluminum with the aluminum comprising from between about 0% to about 50% by weight of the alloy. The greater the amounts of aluminum present by weight in the alloy, however, the lower the energy density of the cell.

The form of the anode may vary, but preferably it is a thin metal sheet or foil of the lithium pressed or rolled on a metallic anode current collector, i.e., preferably comprising nickel. The anode current collector has an extended tab or lead contacted by a weld to the cell case 20 of conductive metal in a case-negative electrical configuration. Alternatively, the anode may be formed in some other geometry, such as a bobbin shape, cylinder or pellet to allow an alternate low surface cell design.

The cathode 66 comprises a material capable of conversion of ions that migrate from the anode to the cathode into atomic or molecular forms. A suitable cathode active material is a mixed metal oxide formed by the chemical addition, reaction or otherwise intimate contact or by a thermal spray coating process of various metal sulfides, metal oxides or metal oxide/elemental metal combinations. Suitable cathode active materials include silver vanadium oxide, copper silver vanadium oxide, manganese dioxide, lithium cobalt oxide, lithium nickel oxide, copper oxide, titanium disulfide, copper sulfide, iron sulfide, iron disulfide, copper vanadium oxide, carbon, fluorinated carbon, and mixtures thereof.

The anode electrode 64 is in electrochemical association with the cathode 66 through a thin sheet of separator material 68. The separator surrounds and envelops at least one of the anode 64, the cathode 66, or both, to prevent direct physical contact between them.

For a typical lithium/silver vanadium oxide cell, the cathode current collector is of titanium and the terminal lead 78 is of molybdenum, and separators 68 are polypropylene. The activating electrolyte is a 1.0M to 1.4M solution of $LiAsF_6$ or $LiPF_6$ in a 50:50 mixture of, by volume, 1,2-dimethoxyethane and propylene carbonate.

In a broader sense, however, the electrode assembly 26 is of any primary or secondary electrochemical system known to those of ordinary skill in the art. The above description merely describes the minimum components of the electrode assembly housed in the casing, which are an anode, a cathode, and an electrolyte, and, if needed, a separator. Accordingly, any type of electrode assembly that can be inserted into and operate in a casing having an electrolyte fill aperture is usable with the present invention.

Figure 5:
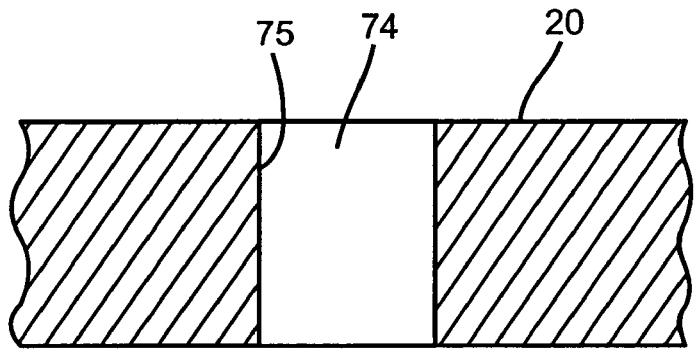
FIG. 5 is a cross-sectional view of FIG. 4 taken along lines 5-5.
Figure 6:
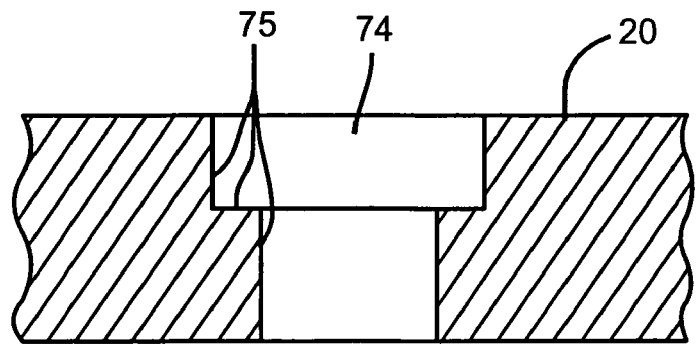
FIG. 6 is an alternate embodiment of FIG. 5.
Figure 7:
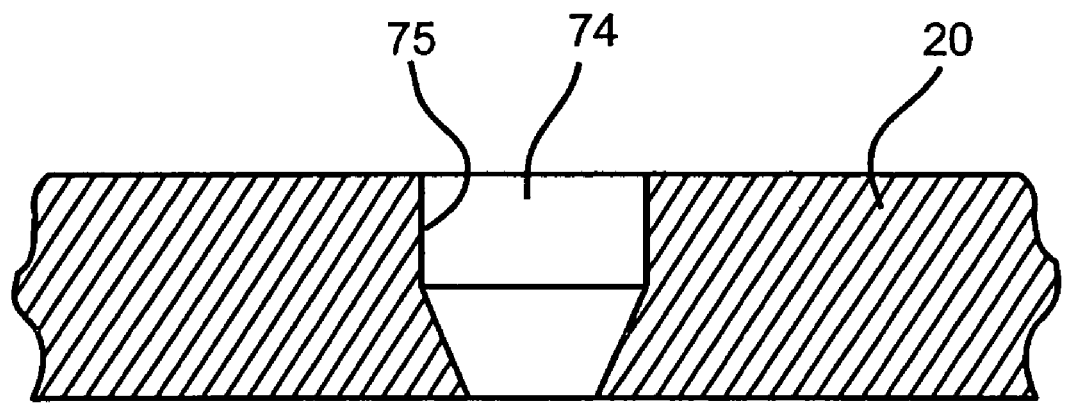
FIG. 7 is an alternate embodiment of FIG. 5.
Figure 8:
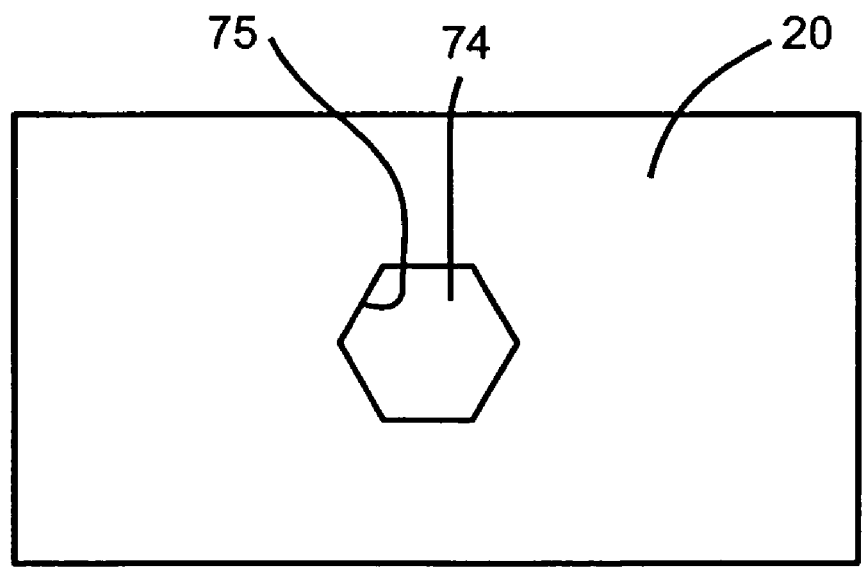
FIG. 8 is an alternate embodiment of FIG. 4 taken from box 8.

The electrolyte fill aperture 74 can have various shapes and designs. Examples include, and are not limited to, a cylindrical aperture (FIGS. 4 and 5), a discontinuous cylindrical aperture (FIG. 6), an aperture having a frusto-conical portion (FIG. 7), a polygonal aperture (FIG. 8), and variations thereof.

Figure 9:
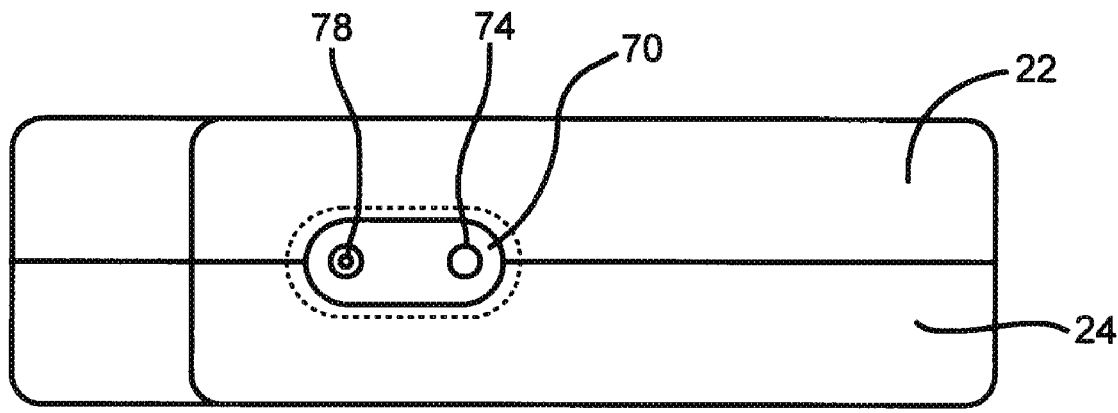
FIG. 9 is an alternate embodiment of FIG. 3 taken along the lines 9-9.

The electrolyte fill aperture 74 can be a part of the casing 20 as illustrated in FIGS. 1 to 3 and 13 or a part of a header 70 as illustrated in FIG. 9 that is attached to the casing 20. More information about how headers 70 are used is disclosed in U.S. Pat. No. 6,610,443 to Paulot et al., which is hereby incorporated by reference herein.

Figure 11A:
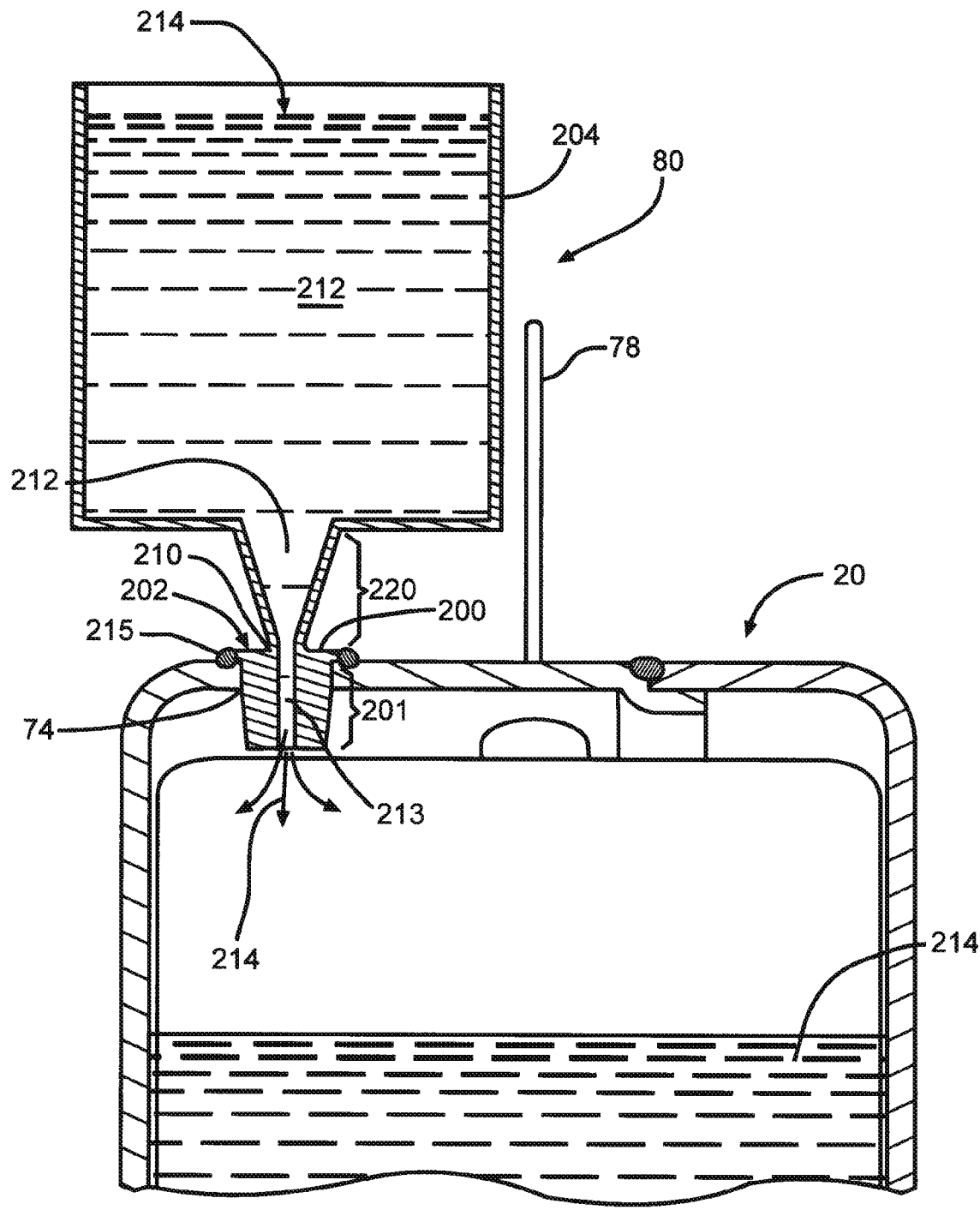
FIG. 11A illustrates an alternate embodiment of the fill plug after being secured to the casing.

The electrolyte fill aperture 74 receives and directs an electrolyte 214 into the casing 20. The electrolyte 214 can be poured through the electrolyte fill opening either prior to inserting a plug therein (FIG. 11) or after inserting the fill plug, as illustrated in FIG. 11A.

Unlike the comparatively small prior art fill plugs that can be easily misplaced and/or mispositioned within the electrolyte fill aperture 74, the present invention fill plug 80 is easily inserted into the electrolyte fill aperture 74 and secured to the casing 20. The fill plug 80 can be any metal or polymer that withstands the conditions of being incorporated into an electrochemical cell and contacted by electrolyte.

Figure 10:
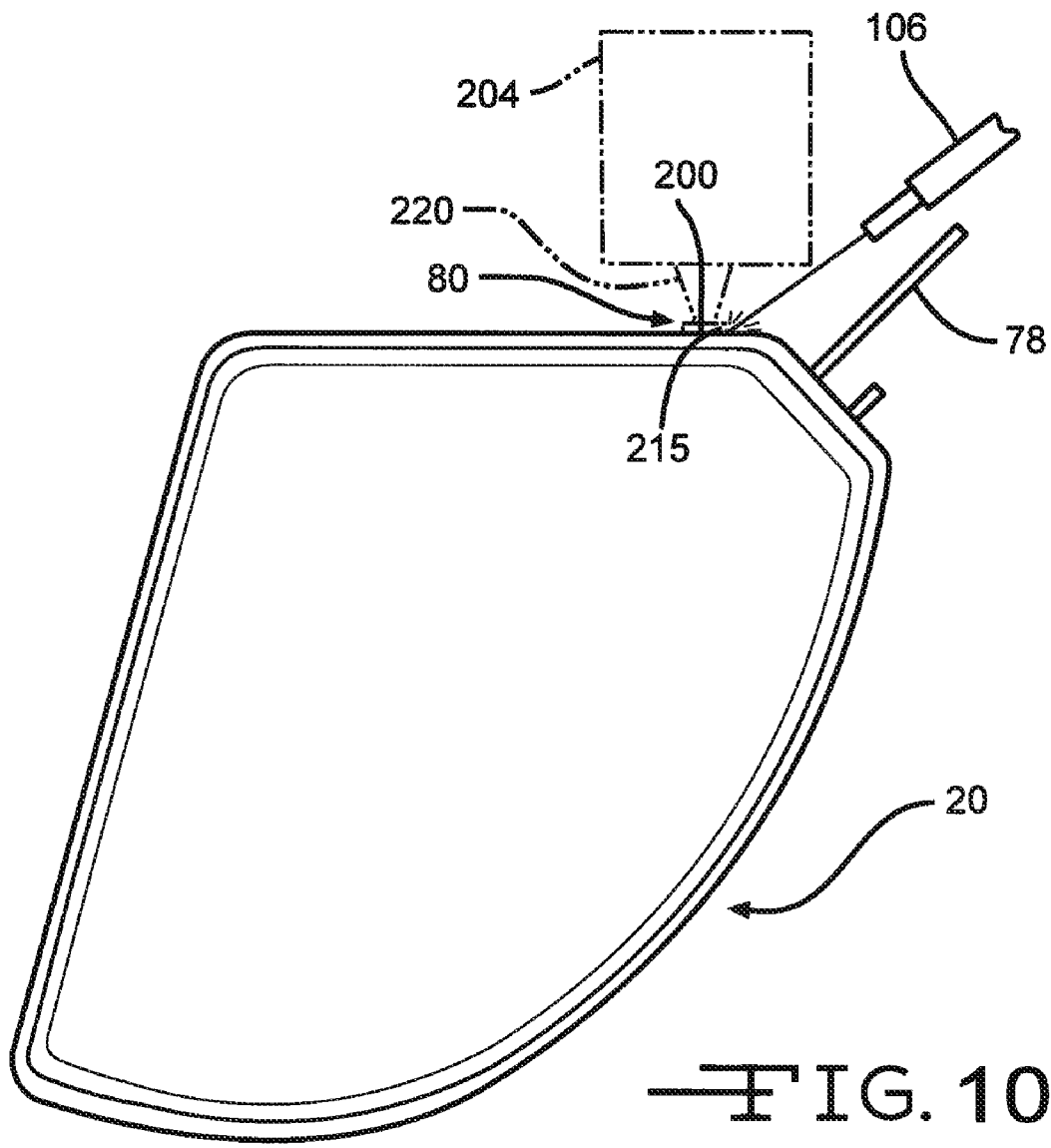
FIG. 10 illustrates the insertion of a fill plug into the electrolyte fill aperture of a casing and it being secured thereto.

The fill plug 80 has at least two distinct sections, an insert section 202 (FIGS. 11, 11A, 12 and 13) and a placement unit 204 (shown in phantom lines in FIG. 10). They can be the same material, as identified above, or be of different materials. The insert section 202 can be further divided into a male component 201 and an optional base component 200. As shown in FIGS. 11, 11A and 13, the male component 201 is received in the electrolyte fill aperture 74 and contacts the sidewall 75 of the aperture 74, as illustrated in FIGS. 5 to 8. This means the male component 201 can be of any shape that plugs the corresponding electrolyte fill aperture 74 and assists in preventing hermetic compromise of the electrochemical cell. As illustrated in FIG. 11, the optional base 200 can be of any shape that extends beyond the dimension of the fill aperture 74 and contacts the upper surface of the sidewall forming the aperture. In that manner, the base 200 allows the user to more easily secure the insert section 202 to the casing 20.

The second section of the fill plug is the placement unit 204. The insert section 202 and the placement unit 204 are preferably of a unitary metallic construction. The placement unit 204 can be of any size and shape that allows a user or machine (not shown) to hold and properly position the insert section 202 into the electrolyte fill aperture 74. Once the insert section 202 is press fit into an interference relationship with the fill aperture 74, the placement unit 204 is separated there from. In FIG. 10 the placement unit 204 is shown in phantom depicting it as having already been separated from the insert section 202 plugging the fill aperture 74. A conventional laser welder 106 is then used to hermetically seal the insert section 202 to the casing 20 (FIG. 10) through a weldment 215 securing between the base 200 and the sidewall forming the aperture 74.

In that respect, the placement unit 204 is preferably detachably attached to the insert section 202, which means that the placement unit 204 and insert section 202 are a unitary member until a desired force is applied to the placement unit to separate them from each other. As illustrated in FIGS. 10 and 11, the placement unit 204 comprises a tapered section 220 that narrows downwardly and inwardly to a stress point section 210 proximate the base component 200 of the insert section 202. This is where the placement unit 204 and the base component of the insert section 202 separate from each other under a twisting force, bending force, or other suitable force. The stress point section 210 can be obtained by various means. One is by sufficiently thinning the material there. Another is by perforating (or the equivalent thereof) the stress point section 210.

An exemplary fill plug for an electrochemical cell of the type typically used to power an implantable medical device has the following dimensions. The male component 201 of the insert section 202 has a diameter of about 0.0380 inches and a length of about 0.045 inches. The base 200 of the insert section 202 has a diameter of about 0.045 inches and a thickness of about 0.003 to about 0.006 inches. The placement unit 204 has a height of about 0.2 inches and a diameter of about 0.188 inches. The stress point section 210 between the male component 201 of the insert section 202 and the placement unit 204 has a diameter of about inches.

As illustrated in FIG. 11, one embodiment has the placement unit 204 and the tapered section 220 provided with a hollowed out area 212 in fluid flow communication with a through bore 213 in the insert section 202. The hollowed out area 212 contains the electrolyte 214 that is filled into the case 20. Once the electrolyte has been filled into the casing by flowing from the placement unit 204 through the tapered section 220 and then into the bore 213 in the insert section 202, and the placement unit 204 has been detached from the insert section 202 at the stress point section 210 proximate the base component 200, the laser welder 106 (FIG. 12) is used to close the bore in the insert section at point 260. Alternatively, if the insert section 202 does not have a trough bore, this is not required.

In another embodiment, the insert system 202 need not have base 200. The welding can occur at the insert section 202 that is at least flush and/or protruding from the exterior surface of the casing 20.

While preferred embodiments of the present invention have been disclosed, it will be appreciated that it is not limited thereto, but may be otherwise embodied with the scope of the following claims.

What is claimed is:

1. An electrochemical cell, which comprises:
   a) a casing that contains at least an anode and a cathode segregated from each other by a separator and activated by an electrolyte, wherein the casing has an electrolyte fill aperture that receives and directs the electrolyte therein;
   b) an electrolyte fill plug having an insert section and a placement unit, wherein the insert section resides in the electrolyte fill aperture in the casing; and
   c) wherein the placement unit is detachable from the insert section.

2. The electrochemical cell of claim 1 wherein the insert section of the electrolyte fill plug is hermetically secured to the casing and wherein the placement unit is detachable from the insert section either before or after the insert section is secured to the casing.

3. The electrochemical cell of claim 1 wherein the electrolyte fill aperture is part of a header assembly.

4. The electrochemical cell of claim 1 wherein the casing is a clamshell casing or a prismatic casing.

5. The electrochemical cell of claim 1 wherein the electrolyte is provided in the casing prior to the insert section being inserted into the electrolyte fill aperture.

6. The electrochemical cell of claim 1 wherein the electrolyte is provided in the casing after the insert section is inserted into the electrolyte fill aperture.

7. The electrochemical cell of claim 6 wherein the insert section and the placement unit are hollowed out to allow the electrolyte to flow from the placement unit, through the hollowed out insert section and into the casing.

8. The electrochemical cell of claim 1 wherein the placement unit and the insert section are of the same or different material.

9. The electrochemical cell of claim 1 wherein the electrolyte fill plug is selected from the group consisting of metal, polymer, and combinations thereof.

10. The electrochemical cell of claim 1 wherein the placement unit and the insert section are detachable from each other at a stress point section.

11. The electrochemical cell of claim 10 wherein the stress point section is perforated.

12. The electrochemical cell of claim 1 wherein with the insert section positioned in the electrolyte fill aperture, at least a portion of the insert section is at least flush with or protruding from an exterior surface of the casing.

13. The electrochemical cell of claim 1 wherein the insert section has a male component received in the electrolyte fill aperture and a base section that contacts the casing forming the fill aperture.

14. An electrochemical cell, which comprises:
   a) a casing that contains at least an anode and a cathode segregated from each other by a separator and activated by an electrolyte, wherein the casing has an electrolyte fill aperture that receives and directs the electrolyte therein; and
   b) an electrolyte fill plug comprising an insert section in fluid flow communication with a placement unit, wherein the placement unit is manipulatable to enable the insert section to be inserted into the electrolyte fill aperture and then have electrolyte flow from the placement unit through the insert section and into the casing and wherein the placement unit is detachable from the insert section of the electrolyte fill plug after the electrolyte flows into the casing.

15. A method for providing an electrochemical cell, comprising the steps of:
   a) providing a casing housing an anode and a cathode segregated from each other by a separator, the casing comprising an electrolyte fill aperture;
   b) providing an electrolyte fill plug comprising an insert section detachably connected to a placement unit;
   c) manipulating the placement unit to move the insert section of the fill plug into the electrolyte fill aperture;
   d) flowing an electrolyte from the placement unit of the fill plug, through a hollowed out section in the insert section and into the casing to activate the anode and the cathode;
   e) detaching the placement unit from the insert section; and
   f) sealing the hollowed out section in the insert section of the fill plug.

16. The method of claim 15 including providing the insert section and the placement unit having a hollowed out section.

17. The method of claim 16 further comprising the step of welding the hollowed out section of the insert section after the placement unit is detached therefrom to thereby seal the insert section of the electrolyte fill plug.

18. An electrochemical cell, which comprises:
   a) a casing that contains at least an anode and a cathode segregated from each other by a separator and activated by an electrolyte, wherein the casing has an electrolyte fill aperture;
   b) an insert section of an electrolyte plug residing in the electrolyte fill aperture in the casing; and
   c) wherein the insert section is characterized as having been connected to a placement unit that facilitated it being moved into the electrolyte fill aperture, but to which it is no longer connected.

19. A method for providing an electrochemical cell, comprising the steps of:
   a) providing a casing housing an anode and a cathode segregated from each other by a separator, the casing comprising an electrolyte fill aperture;
   b) filling an electrolyte through the aperture and into the casing to thereby activate the anode and the cathode;
   c) providing a plug comprising an insert section detachably connected to a placement unit;

d) manipulating the placement unit to move the insert section of the plug into the electrolyte fill aperture; and e) detaching the placement unit from the insert section.

20. A method for providing an electrochemical cell, comprising the steps of:

a) providing a casing housing an anode and a cathode segregated from each other by a separator, the casing comprising an electrolyte fill aperture;

b) providing an electrolyte fill plug comprising an insert section detachably connected to a placement unit;

c) manipulating the placement unit to move the insert section of the fill plug into the electrolyte fill aperture;

d) flowing an electrolyte from the placement unit of the fill plug, through a hollowed out section in the insert section and into the casing to activate the anode and the cathode;

e) detaching the placement unit from the insert section; and f) sealing the hollowed out section in the insert section of the fill plug.

* * * * *